(12) United States Patent
Feight et al.

(10) Patent No.: US 7,746,241 B2
(45) Date of Patent: Jun. 29, 2010

(54) MAGNETIC PROBE APPARATUS AND METHOD FOR PROVIDING A WIRELESS CONNECTION TO A DETECTION DEVICE

(75) Inventors: Laurence Virgil Feight, Island Lake, IL (US); Edmund O. Schweitzer, III, Pullman, WA (US); Witold R. Tellor, Pullman, WA (US); Donald C. Hicks, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 552 days.

(21) Appl. No.: 11/750,841

(22) Filed: May 18, 2007

(65) Prior Publication Data

US 2008/0012702 A1     Jan. 17, 2008

Related U.S. Application Data

(60) Provisional application No. 60/802,219, filed on May 19, 2006.

(51) Int. Cl.
*G08B 21/00* (2006.01)
(52) U.S. Cl. .................. 340/635; 340/448; 340/539.22; 340/538; 340/445; 455/41.1; 324/207.15; 324/207.19
(58) Field of Classification Search ................................ 340/539.22–539.26, 635, 538, 870.25, 445, 340/448; 455/41.1; 324/207.15, 207.19
See application file for complete search history.

(56) References Cited

U.S. PATENT DOCUMENTS

| | | | |
|---|---|---|---|
| 2,379,664 A | 7/1945 | Stanko | |
| 2,928,048 A | 3/1960 | Postal | |
| 2,967,267 A | 1/1961 | Steinman | |
| 3,292,579 A | 12/1966 | Buchanan | |
| 3,296,493 A | 1/1967 | Whittaker | |
| 3,476,997 A | 11/1969 | Otzipka | |
| 3,525,903 A | 8/1970 | Morris | |
| 3,621,334 A | 11/1971 | Burns | |
| 3,676,740 A | 7/1972 | Schweitzer | |
| 3,702,966 A | 11/1972 | Schweitzer | |
| 3,708,724 A | 1/1973 | Schweitzer | |
| 3,715,742 A | 2/1973 | Schweitzer | |
| 3,781,682 A | 12/1973 | Schweitzer | |
| 3,816,816 A | 6/1974 | Schweitzer | |
| 3,866,197 A | 2/1975 | Schweitzer . | |

(Continued)

OTHER PUBLICATIONS

Fisher Priece Division of Pacific Scientific—Faulted Circuit Indicators—Technical Applications Data 1995; Anh Le, Dave Donovan, Bill Doherty.

(Continued)

*Primary Examiner*—George A Bugg
*Assistant Examiner*—Hongmin Fan
(74) *Attorney, Agent, or Firm*—Eugene M. Cummings, P.C.

(57) ABSTRACT

A system for communicating information from a detection device is provided through a waterproof and wireless interface. The system generally includes a communication member having an inductor and coupled to the detection device. An interface including another inductor is in communicating relation with the communication member. Upon a signal from the detection device, a magnetic field is produced by the inductor of the communication member and is transmitted to the inductor of the interface.

29 Claims, 13 Drawing Sheets

U.S. PATENT DOCUMENTS

| | | |
|---|---|---|
| 3,876,911 A | 4/1975 | Schweitzer |
| 3,906,477 A | 9/1975 | Schweitzer |
| 3,972,581 A | 8/1976 | Oldham |
| 3,974,446 A | 8/1976 | Schweitzer |
| 4,029,951 A | 6/1977 | Berry |
| 4,034,360 A | 7/1977 | Schweitzer |
| 4,038,625 A | 7/1977 | Tompkins |
| 4,045,726 A | 8/1977 | Schweitzer |
| 4,063,171 A | 12/1977 | Schweitzer |
| 4,086,529 A | 4/1978 | Schweitzer |
| 4,112,292 A | 9/1978 | Varvel |
| 4,144,485 A | 3/1979 | Akita |
| 4,165,528 A | 8/1979 | Schweitzer |
| 4,186,986 A | 2/1980 | Shoemaker |
| 4,199,741 A | 4/1980 | Serrus Paulet |
| 4,234,847 A | 11/1980 | Schweitzer |
| 4,251,770 A | 2/1981 | Schweitzer |
| 4,288,743 A | 9/1981 | Schweitzer |
| 4,375,617 A | 3/1983 | Schweitzer |
| 4,414,543 A | 11/1983 | Schweitzer |
| 4,424,512 A | 1/1984 | Schweitzer |
| 4,438,403 A | 3/1984 | Schweitzer |
| 4,458,198 A | 7/1984 | Schweitzer |
| 4,495,489 A | 1/1985 | Schweitzer |
| 4,536,758 A | 8/1985 | Schweitzer |
| 4,686,518 A | 8/1987 | Schweitzer |
| 4,689,752 A | 8/1987 | Fernandes |
| 4,709,339 A | 11/1987 | Fernandes |
| 4,794,332 A | 12/1988 | Schweitzer |
| 4,795,982 A | 1/1989 | Schweitzer |
| 4,829,298 A | 5/1989 | Fernandes |
| 4,940,976 A | 7/1990 | Gastouniotis |
| 4,996,624 A | 2/1991 | Schweitzer |
| 5,008,651 A | 4/1991 | Schweitzer |
| 5,038,246 A | 8/1991 | Durivage |
| 5,070,301 A | 12/1991 | Schweitzer |
| 5,089,928 A | 2/1992 | Durivage |
| 5,136,457 A | 8/1992 | Durivage |
| 5,136,458 A | 8/1992 | Durivage |
| 5,150,361 A | 9/1992 | Wieczorek |
| 5,153,565 A | 10/1992 | Schweitzer |
| 5,168,414 A | 12/1992 | Horstmann |
| 5,196,682 A | 3/1993 | Englehardt |
| 5,220,311 A | 6/1993 | Schweitzer |
| 5,298,894 A | 3/1994 | Cerney |
| 5,420,502 A | 5/1995 | Schweitzer |
| 5,438,329 A | 8/1995 | Gastouniotis |
| 5,495,239 A | 2/1996 | Ouellette |
| 5,519,527 A | 5/1996 | Panton |
| 5,550,476 A | 8/1996 | Lau |
| 5,565,783 A | 10/1996 | Lau |
| 5,648,726 A | 7/1997 | Le |
| 5,656,931 A | 8/1997 | Lau |
| 5,659,300 A | 8/1997 | Dresselhuys |
| 5,677,623 A | 10/1997 | Schweitzer |
| 5,677,678 A | 10/1997 | Schweitzer |
| 5,701,121 A | 12/1997 | Murdoch |
| 5,793,214 A | 8/1998 | Wakamatsu |
| 5,821,869 A | 10/1998 | Schweitzer |
| 5,825,303 A | 10/1998 | Bloss |
| 5,851,108 A * | 12/1998 | Clymer et al. ............. 417/44.1 |
| 5,877,703 A | 3/1999 | Bloss |
| 5,889,399 A | 3/1999 | Schweitzer |
| 5,959,537 A * | 9/1999 | Banting et al. .............. 340/664 |
| 6,002,260 A | 12/1999 | Lau |
| 6,014,301 A | 1/2000 | Schweitzer |
| 6,016,105 A | 1/2000 | Schweitzer |
| 6,029,061 A | 2/2000 | Kohlschmidt |
| 6,072,405 A | 6/2000 | Sears |
| 6,078,785 A | 6/2000 | Bush |
| 6,133,724 A | 10/2000 | Schweitzer |
| 6,177,883 B1 | 1/2001 | Jannetti |
| 6,188,216 B1 | 2/2001 | Fromer |
| 6,239,722 B1 | 5/2001 | Colton |
| 6,326,905 B1 | 12/2001 | Walters |
| 6,349,248 B1 | 2/2002 | Dean |
| 6,366,217 B1 | 4/2002 | Cunningham |
| 6,380,733 B1 | 4/2002 | Apel |
| 6,414,605 B1 | 7/2002 | Walden |
| 6,429,661 B1 | 8/2002 | Schweitzer |
| 6,433,698 B1 | 8/2002 | Schweitzer |
| 6,479,981 B2 | 11/2002 | Schweitzer |
| 6,525,504 B1 | 2/2003 | Nygren |
| 6,573,707 B2 | 6/2003 | Kiriyama |
| 6,577,608 B1 | 6/2003 | Moon |
| 6,617,976 B2 | 9/2003 | Walden |
| 6,671,824 B1 | 12/2003 | Hyland |
| 6,736,646 B2 | 5/2004 | Takahashi |
| 6,753,792 B2 | 6/2004 | Bechwth |
| 6,759,933 B2 | 7/2004 | Fallak |
| 6,796,821 B2 | 9/2004 | Cairns |
| 6,798,211 B1 * | 9/2004 | Rockwell et al. ............ 324/527 |
| 6,828,906 B2 | 12/2004 | Malcolm |
| 6,944,555 B2 | 9/2005 | Blackett |
| 7,391,299 B2 | 6/2008 | Bender |
| 7,446,672 B2 * | 11/2008 | Johnson et al. ........ 340/870.02 |
| 7,469,838 B2 * | 12/2008 | Brooks et al. ................ 235/493 |
| 7,519,842 B2 * | 4/2009 | Chen et al. ................... 713/310 |
| 2002/0089802 A1 | 7/2002 | Beckwith |
| 2003/0040897 A1 | 2/2003 | Murphy |
| 2003/0119568 A1 | 6/2003 | Menard |
| 2003/0153368 A1 | 8/2003 | Bussan |
| 2003/0174067 A1 | 9/2003 | Soliman |
| 2003/0178290 A1 | 9/2003 | Schilling |
| 2003/0179149 A1 | 9/2003 | Savage |
| 2004/0005809 A1 | 1/2004 | Suzuki |
| 2004/0032340 A1 | 2/2004 | Lingafeldt |
| 2004/0036478 A1 | 2/2004 | Logvinov |
| 2004/0067366 A1 | 4/2004 | Gorczyca |
| 2004/0113810 A1 | 6/2004 | Mason |
| 2004/0214616 A1 | 10/2004 | Malcolm |
| 2004/0233159 A1 | 11/2004 | Badarneh |
| 2005/0040809 A1 | 2/2005 | Uber |
| 2005/0068193 A1 | 3/2005 | Osterloh |
| 2005/0068194 A1 | 3/2005 | Schleich |
| 2005/0079818 A1 | 4/2005 | Atwater |
| 2005/0087599 A1 | 4/2005 | Ward |
| 2005/0110656 A1 | 5/2005 | Patterson |
| 2005/0132115 A1 | 6/2005 | Leach |
| 2005/0151659 A1 | 7/2005 | Donovan |
| 2005/0205395 A1 | 9/2005 | Dietrich |
| 2005/0215280 A1 | 9/2005 | Twitchell, Jr. |
| 2006/0084419 A1 | 4/2006 | Rocamora |
| 2007/0179547 A1 | 8/2007 | Armstrong |

OTHER PUBLICATIONS

Power Mangement Using the Embedded Stand-Alone Wake-Up Protocol. Rev. 2 (Aug. 2002); ATMEL AT86RF211.
Radio Receivers Series 1560 Handheld or RTU/SCADA—Joslyn Hi-Voltage—http://www.joslynhivoltage.com/cat1560.htm and http://www.joslynhivoltage.com/spec1560.htm.
400 Series Buccaneer—Bulgin—www.bulgin.com.uk.
V Series—Lemo.
Fisher Pierce—Radio Faulted Circuit Indicator System—(1999)—Joslyn Hi-Voltage http://www.joslynhivoltage.com/PDFFIles/RFCI.pdf.
Radio Faulted Circuit Indicator System by Joslyn Hi-Voltage, www.joslynhivoltage.com, Fisher Pierce 1999.

* cited by examiner

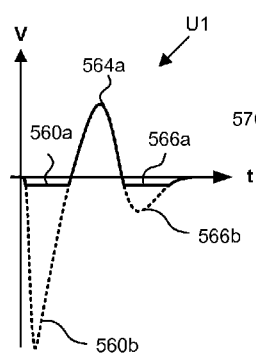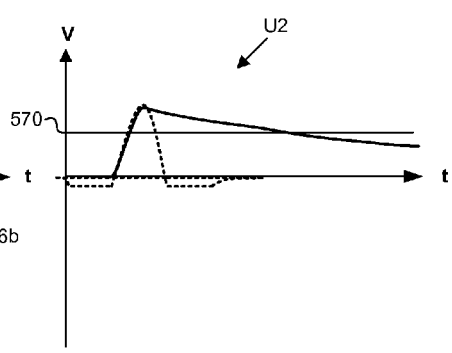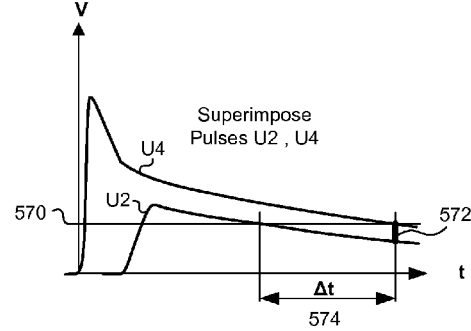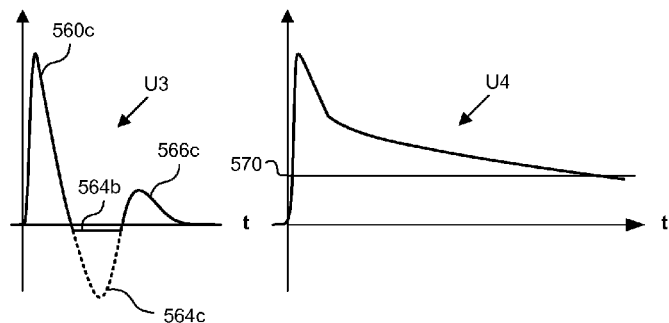
FIG. 13Ai  FIG. 13Bi  FIG. 13C
FIG. 13Aii  FIG. 13Bii

MAGNETIC PROBE APPARATUS AND METHOD FOR PROVIDING A WIRELESS CONNECTION TO A DETECTION DEVICE

CROSS-REFERENCE TO RELATED APPLICATIONS

This application claims benefit under 35 U.S.C. §119(e) of U.S. Provisional Application entitled "MAGNETIC PROBE APPARATUS AND METHOD FOR PROVIDING A WIRELESS CONNECTION TO A POWER SYSTEM DEVICE," filed on May 19, 2006, having Ser. No. 60/802,219, naming Edmund O. Schweitzer III, Witold Teller, Donald C. Hicks, and Laurence Virgil Feight as inventors, the complete disclosure thereof being incorporated by reference.

FIELD OF THE INVENTION

The present invention relates generally to an apparatus and method for providing a wireless connection, and more particularly to an apparatus and method for providing a communication member including an inductor for achieving a wireless connection to a detection device.

DESCRIPTION OF THE PRIOR ART

Power transmission and distribution systems may include power system protection, monitoring, and control devices such as protective relays, faulted circuit indicators, and the like. Throughout, the term "detection device" will include any device capable of detecting a state such as a power system device for power system protection, monitoring, or control. Power system device may also be used herein to describe any device associated with the devices which protect, monitor or control power systems. For example, a radio interface unit used in a power system may also be considered a power system device.

Faulted circuit indicators (FCIs), another type of power system device, play a vital role in detecting and indicating faults and locations of faulted conductors to decrease the duration of power outages and improve the reliability of power systems throughout the world. Electrical utilities depend on faulted circuit indicators to help their employees quickly locate faulted conductors. Most conventional faulted circuit indicators utilize a mechanical target or an LED to provide a visual indication of a faulted conductor. By visually scanning faulted circuit indicators located at a site, an electrical utility crew can quickly locate a fault. Industry statistics indicate that faulted circuit indicators reduce fault location time by 50%-60% versus the use of manual techniques, such as the "refuse and sectionalize" method. Nonetheless, electrical utilities still spend substantial amounts of time and money determining the locations of faults on their networks.

Electrical utilities rely on a number of additional techniques to further decrease time spent locating faults. For instance, modern faulted circuit indicators frequently have one or more contact outputs that activate on the detection of a fault. These contact outputs can be connected to a Supervisory Control and Data Acquisition ("SCADA") system, allowing remote monitoring of a given faulted circuit indicator's status. This technique works well for above-ground sites where a cable from the faulted circuit indicator to a monitoring device can be installed and the monitoring device can be connected to a remote site by a communications line. However, this technique is expensive for underground sites where an underground communications line must be installed.

Another recent advancement is the use of Radio Frequency ("RF") technology within fault circuit indication systems. In one prior art system, each faulted circuit indicator communicates with a radio interface unit which communicates the occurrence of a fault to an external receiver. The radio interface unit is often located in proximity to an FCI within an underground vault, which is susceptible to external elements. For example, vaults may often be filled with water thereby exposing the radio interface unit located therein to also be exposed to such. In another example, for overhead FCI systems, radio interface units are also exposed to the external elements as they are situated in proximity to the overhead FCI device.

As such, any connections to an FCI, radio interface unit, radio transceiver or the like are also exposed to external elements. Prior art connection arrangements among such electronic devices include so-called waterproof connectors which physically and electrically mate via metal contacts. More specifically, these so-called waterproof connectors include a plurality of metal pins which mate with respective metal contacts in order to provide a conductive path therebetween. Through this pin-to-metal contact arrangement there is, in effect, a wired connection between the electronic devices.

When subjecting these prior art connectors to harsh external elements such as submersion in water, the metal contacts often corrode or alternatively cause a short circuit in the electronic components connected thereto. Alternatively, these metal contacts from these connectors may cause electrical sparks which are dangerous in various conditions, (e.g., environments where the connectors are exposed to flammable liquids or gases). Accordingly, it is an aspect of the present invention to provide a wireless, waterproof connection. It is also an aspect of the present invention to provide a communication member having an inductor which communicates with an interface of a detection device in order to provide a wireless, waterproof connection between. It is also an aspect of the present invention to provide a communication member having an inductor which communicates with an interface of a detection device in order to provide a safe connection in conditions susceptible to electrical sparks.

Moreover, these prior art so-called waterproof connections necessitate an outlet in the housing for exposing the metal contacts. During persistent harsh conditions such as submersion in water, water may seep through these outlets and thereby damage the electronic components housed therein. Likewise, the corresponding metal pins may also expose the wires or other components connected thereto to external elements. Accordingly, it is also an aspect of the present invention to provide a wireless, waterproof interface which allows for the electronic components to be contained within each device, and the cable to be in a communicating relationship thereto and to be each situated in a housing which is substantially unexposed to the external elements. It is also an aspect of the present invention to provide a communication member having an inductor which is substantially self-contained which communicates with an interface of a detection device that is substantially self-contained in order to provide a wireless, waterproof connection.

SUMMARY OF THE INVENTION

A system for communicating information from a detection device is provided through a waterproof and wireless interface arrangement. The system generally includes a communication member coupled to the detection device. The communication member includes an inductor. An interface including another inductor is in communicating relation with the communication member. Upon a signal from the detection device, a magnetic field is produced by the inductor of the communication member and is transmitted to the inductor of the interface. In one embodiment, the detection device may be a faulted circuit indicator. In another embodiment, the interface may be a radio transmitter for transmitting information related to the detection device or the power system.

In another embodiment, the interface includes a differential inductor coil configuration for reducing magnetic field interference.

In yet another embodiment, the communication member includes a differential inductor coil configuration for reducing magnetic field interference.

Further provided is a system for detecting whether a connection member of a detection device is in communicating relation with a device interface. The system generally includes a connection member including a magnet. The connection member is further coupled to a detection device. A device interface is further provided including a magnetic field sensor, wherein upon detection of a magnetic field produced by the magnet of the connection member, the magnetic field sensor signals that the connection member is in communicating relation with the device interface.

BRIEF DESCRIPTION OF THE DRAWINGS

Although the characteristic features of this invention will be particularly pointed out in the claims, the invention itself and the manner in which it can be made and used, can be better understood by referring to the following description taken in connection with the accompanying drawings forming a part hereof, wherein like reference numerals refer to like parts throughout the several views and in which:

FIGS. 13A-13C are graphical representations depicting the progression of a ringing pulse exiting the detection circuit of FIG. 12 and the suppression of false latching caused by ringing.

DETAILED DESCRIPTION OF THE ILLUSTRATED EMBODIMENT

Figure 1:
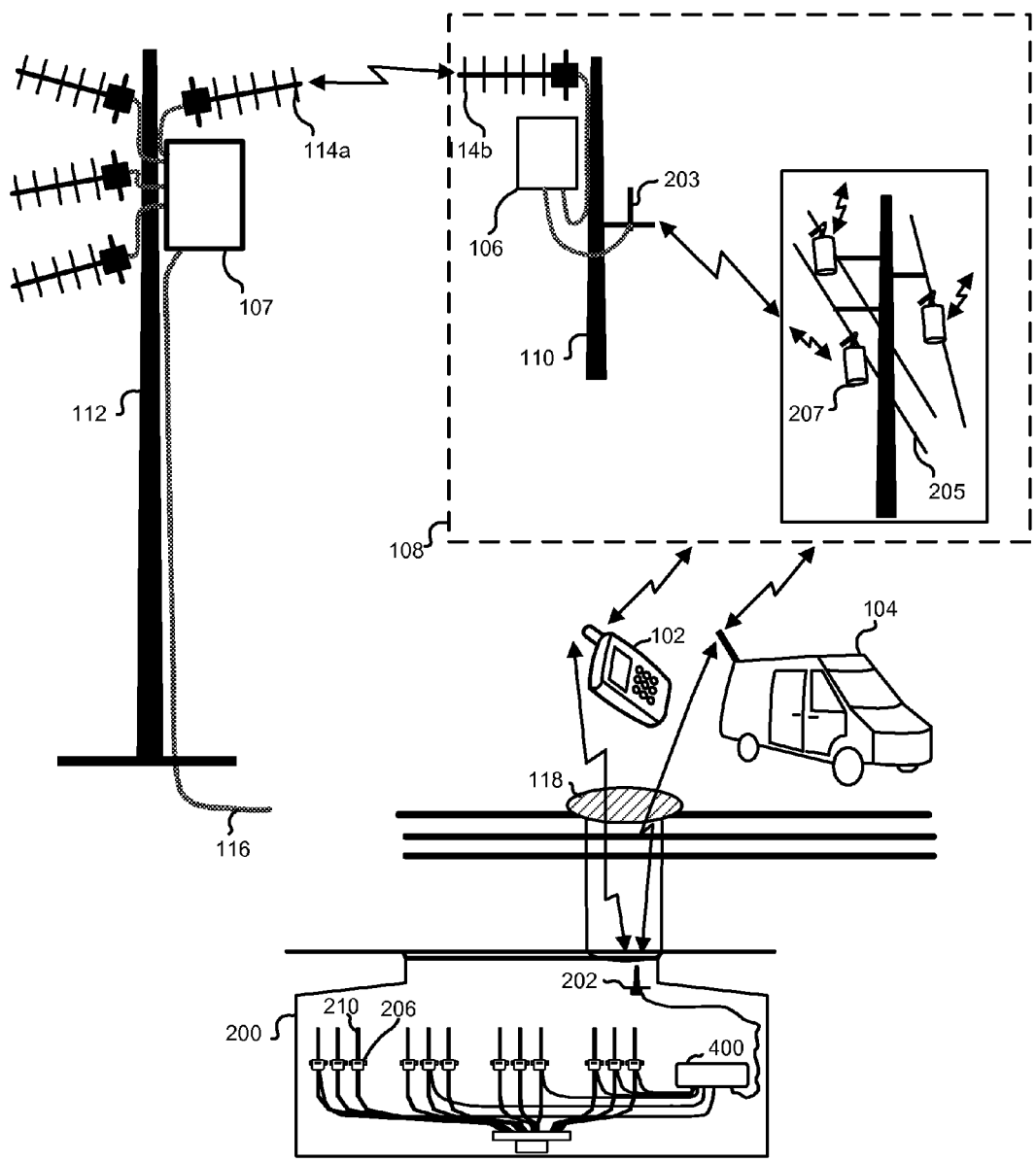
FIG. 1 illustrates a system view of a faulted circuit indicator monitoring system in accordance with an aspect of the present invention.

FIG. 1 illustrates a faulted circuit indicator monitoring system. A number of overhead faulted circuit indicators 207 each contain a two-way radio that communicates the occurrence of a fault via a short range antenna 203 to a local site 110 having an intelligent module 106 installed near the faulted circuit indicators 207. The intelligent module then uses the existing wired telephone network (not shown) or a long range RF antenna 114b to communicate the fault occurrence to a remote site 112 via another long range RF antenna 114a. The remote site 112 includes a remote intelligent module 107, which is connected to another site (not shown) via a wired connection 116. When a fault is detected by a faulted circuit indicator, the occurrence is relayed in the manner described above to the remote site 112, triggering the dispatch of a team to the fault site. The fault team then uses a wireless device 102. In one example, the wireless device may be installed in a vehicle 104 to determine which conductor 205 is faulted.

Figure 2:
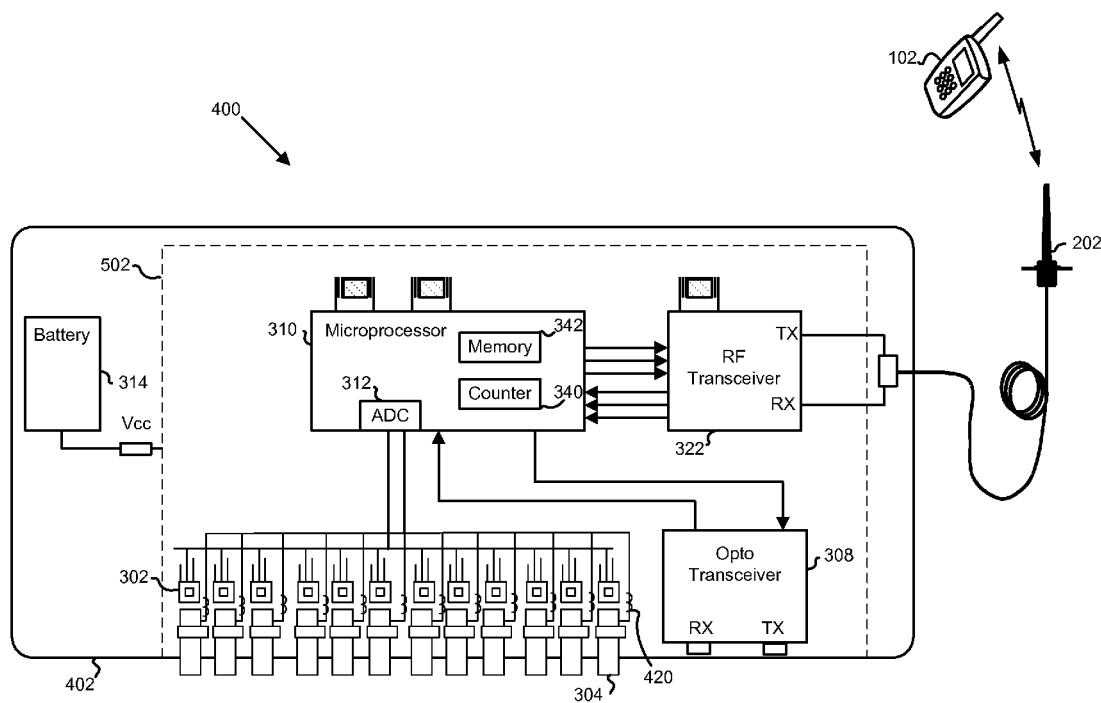
FIG. 2 illustrates a circuit diagram of the radio interface unit of FIG. 1 in accordance with an aspect of the present invention.

Referring to FIG. 2, a circuit diagram of the radio interface unit 400 is illustrated. Contained within the housing 402 are various electronic components. A number of the electronic components may be contained on a printed circuit board 502. The electronic components of the radio interface unit 400 are powered by battery 314. These electronic components may, among other things, detect whether a communication member (e.g., a probe including an inductor) is connected to the radio interface unit 400 via magnetic field sensor such as hall-effect sensors (e.g., at 302); receive a signal from a detection device such as an FCI via the interface between the communication member and inductors (e.g., at 420) disposed in relation to a cavity (e.g., at 304) interface; convert the received signal from an analog to digital signal via analog-to-digital converter 312; record power system information derived from the received signal via counter 340 or memory location 342; obtain or otherwise download various information via optical transceiver 308 or the like; transmit various power system data or information via RF transceiver 322 to a wireless apparatus 102 through antenna 202; or receive various information via RF transceiver 322 from wireless apparatus 102 through antenna 202. Although clearly depicted in FIG. 2, the various operations of the radio interface unit 400 are described in greater detail below.

Referring back to FIG. 1, various components of the faulted circuit indicator monitoring system may be located in an underground vault 200 and only accessible through a manhole 118. As discussed above, the underground vault 200 is often susceptible to external elements and even flooding. Accordingly, its contents are also susceptible to external elements such as water. Likewise, overhead FCI systems also include electronic devices which are exposed to external elements. Accordingly, it is desirable that any connections between the electronic devices be wireless and/or waterproof. Moreover, it is also desirable that the communication members (e.g., probes or other wireless connection means) and corresponding detection devices be substantially self-contained.

For example, it is desirable that any connection between each FCI 206 and the radio interface unit 400 of the previous figures be wireless and waterproof. Also, it is desirable that both the communication members (not shown) from the FCI 206 and the radio interface unit 400 each be substantially self-contained.

Figure 3:
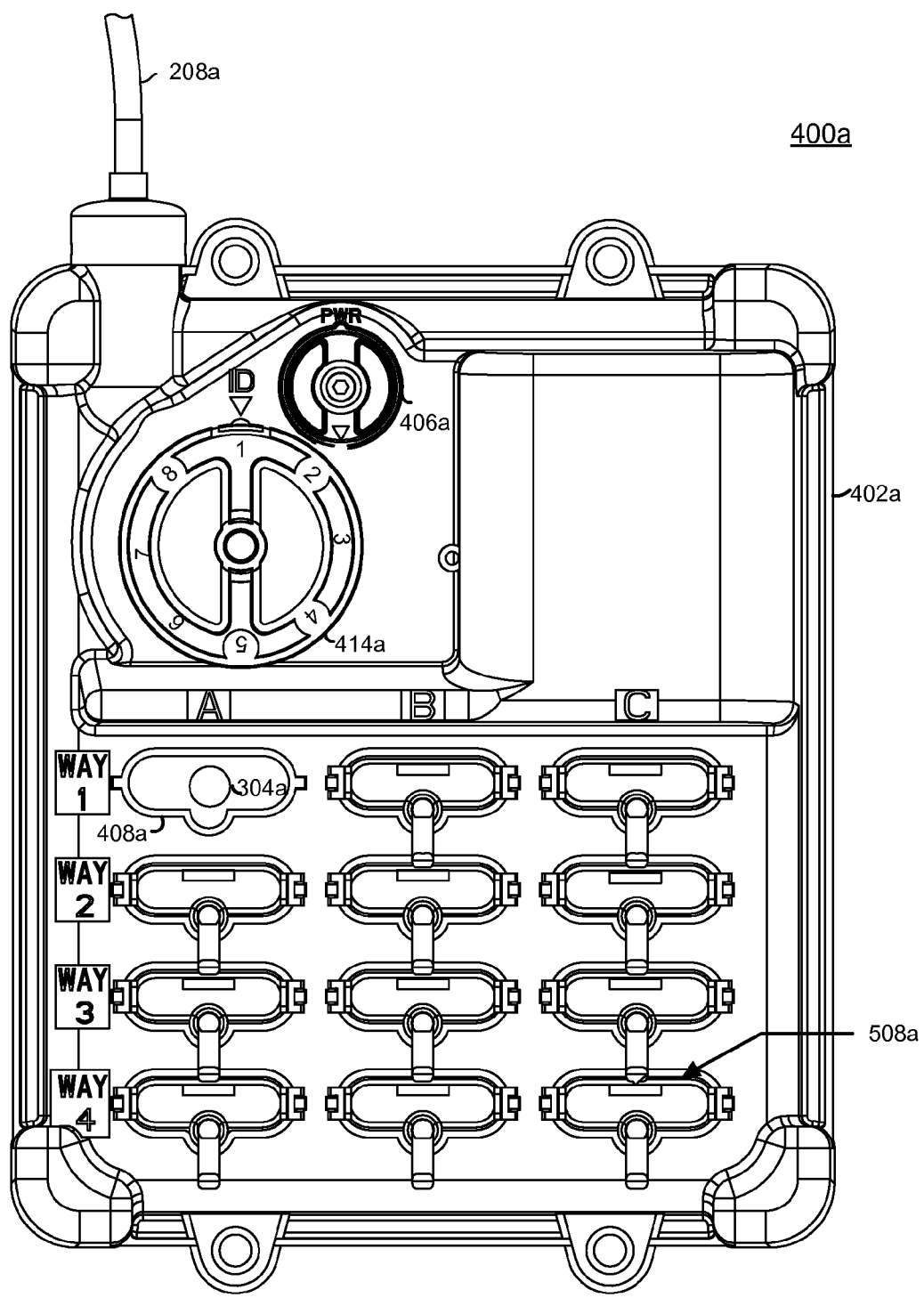
FIG. 3 illustrates an example of the housing of a radio interface unit in accordance with an aspect of the present invention.

Referring to FIG. 3, the radio interface unit 400a includes a housing 402a which is substantially self-contained. Contained within the housing 402a are electronic components (not shown). The electronic components contained within the housing 402a may further be encapsulated using an encapsulate material such as potting material. Encapsulate material provides a physical barrier around the electronic components. This barrier is malleable, providing increased resistance to shock and vibration. In addition, if the material is properly cured, the barrier will be water-tight.

One such encapsulate material is referred to as potting material. Potting material may include epoxy based materials, urethane based materials, silicone based materials, acrylic based materials, polyester based materials, and others Urethane and silicone based materials are the types used most often in the electronics industry. Each particular type of potting material has its own strengths and weaknesses.

With the exception of the opening for antenna 208a, there are generally no outlets or openings in the housing 402a. Accordingly, the housing 402a is substantially self-contained (sealed from the elements). For example, address switch 414a and power switch 406a are separate and apart from the housing 402a in that they do not require any mechanical or electrical connection to any electronic component contained within the housing 402a. The housing 402a further defines cavities (e.g., at 304a) for receiving communication members which may be in the form of inductor coil probes (e.g., at 508a) in a manner in which they do not expose the electronic components contained within the housing 402a to the external environment. Housing 402a may further include a securing member such as a connector socket 408a in order to secure the inductor coil probe 508a within the cavity 304a. Although inductor coil probes are illustrated and described herein, it is intended that any communication member which includes an inductor and produces a magnetic field or communicates information via a magnetic field may be used in place thereof.

The inductor coil probes (e.g., at 508a) which interface the cavities (e.g., at 304a) are coupled to a detection device such as an FCI as described with regards to FIG. 1. The inductor coil probes (e.g., at 508a) are also substantially self-contained. The inductor coil probes (e.g., at 508a) wirelessly communicate with the radio interface unit 400a via cavities (e.g., 304a) in the manner described below.

One particular advantage to having inductor coil probes (e.g., at 508a) which interface the cavities (e.g., at 304a) without a wired or electrical connection, is that the system is closer to being intrinsically safe. Because so-called waterproof connections that require electrical and mechanical connection between the two devices fail after time, the electrical connection may become exposed, and pose a safety risk.

Figure 4A:
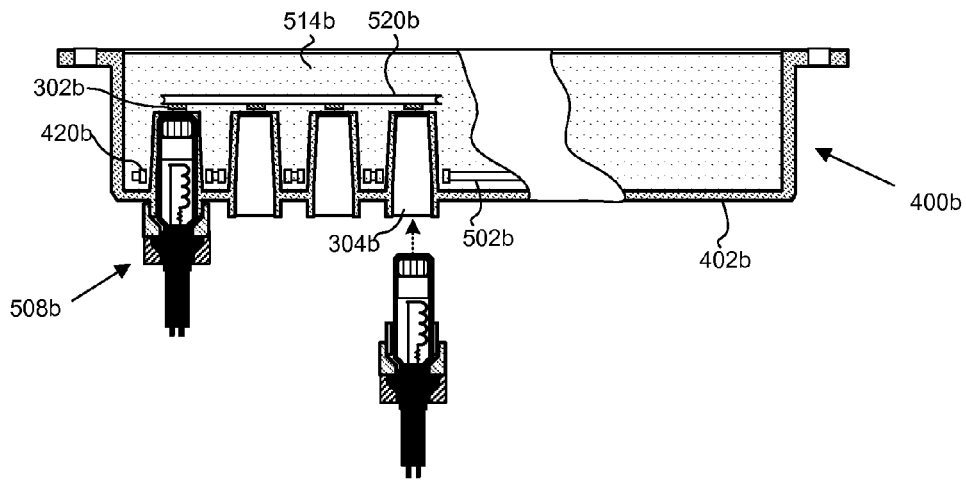
FIGS. 4A and 4B illustrate a cross-sectional view of an embodiment of the present invention system showing the engagement of the communication member and interface.
Figure 4B:
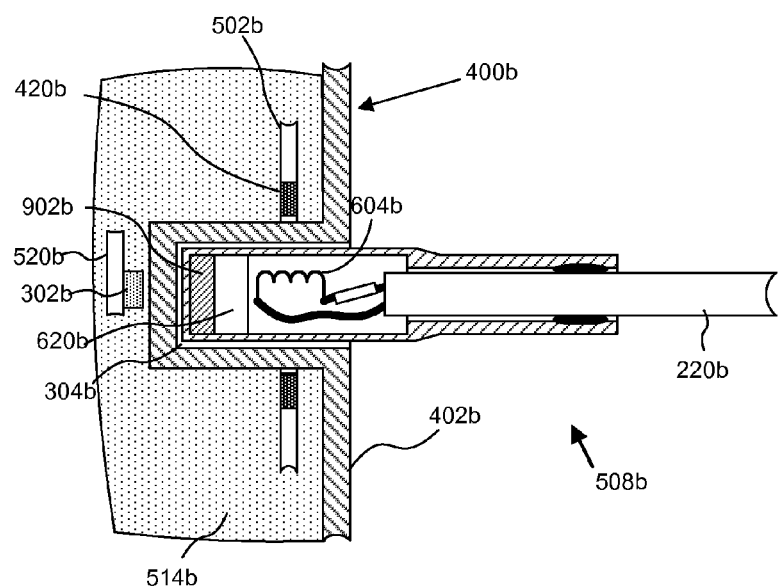
Figure 4C:
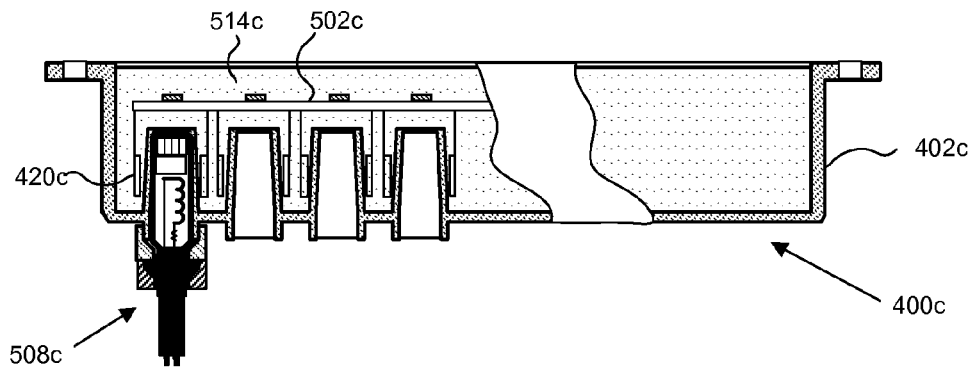
FIGS. 4C and 4D illustrate a cross-sectional view of another embodiment of the present invention system showing the engagement of the communication member and interface.
Figure 4D:
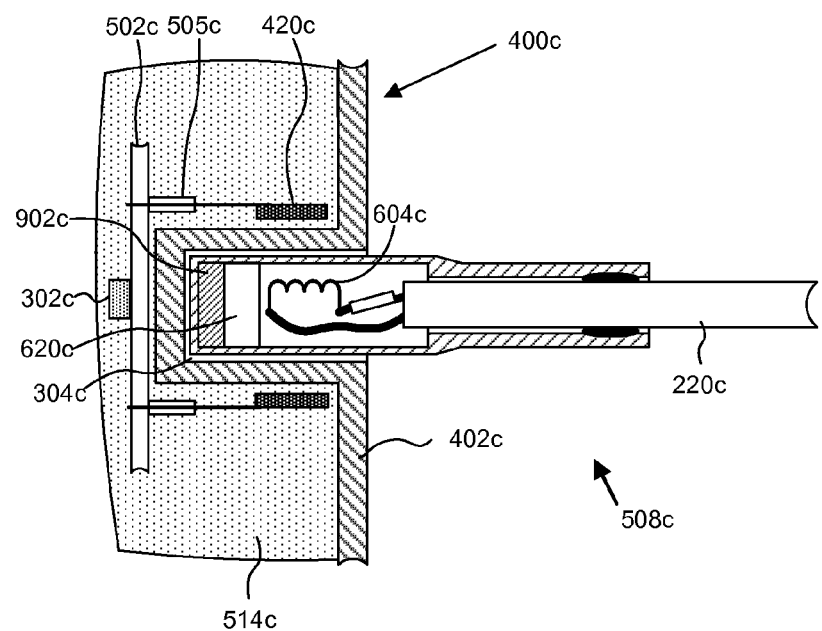

FIGS. 4A and 4B illustrate one embodiment of the hardware arrangement for the circuitry described with respect to FIG. 2 having an interface between an inductor coil probe 508b and a radio interface device 400b. Contained within the housing 402b are various electronic components of the radio interface unit 400b. The electronic components are further encapsulated by an encapsulate material 514b such as a potting material. The housing 402b further defines a plurality of cavities (e.g., at 304b) for receiving inductor coil probes (e.g., at 508b) in a manner in which they do not expose the electronic components contained within the housing 402b to the external environment. Further provided are a printed circuit board 520b which includes a plurality of magnetic field sensors such as hall-effect sensors (e.g., at 320b) and a printed circuit board 502b which includes a plurality of inductors (e.g., at 420b) implemented thereon. In this embodiment, the printed circuit boards 520b and 502b are separate and distinct. FIGS. 4C and 4D are similar to FIGS. 4A and 4B with the exception that only one circuit board 520c is implemented and the inductors are in the form of coiled inductors 420c in the embodiments of FIGS. 4C and 4D.

During operation of each of the embodiments illustrated in FIGS. 4A-4D, the interface between the inductor coil probes (e.g., at 508 b, c) and the radio interface unit 400 b, c is as follows. The inductor coil probes (e.g., at 508 b, c) may be inserted into the cavities (e.g., at 304 b, c). For example, as shown in FIGS. 4B and 4D, a magnet 902 b, c is situated at the end of the inductor coil probe 508 b, c. A corresponding magnetic field sensor (e.g., a hall-effect sensor) 302 b, c situated on printed circuit board 502b, 520c detects the presence of a magnetic field from magnet 902 b, c upon insertion of the inductor coil probe 508 b, c into the cavity 304 b, c. The magnetic field sensor 302 b, c produces a signal to the microprocessor, thereby signaling the presence of an inductor coil probe 508 b, c. A spacer 620 b, c is further provided in order to prevent the magnet 902 b, c from affecting the inductor coil 604 b, c contained within the inductor coil probe 508 b, c. Although a hall-effect sensor is described herein, other suitable magnetic field sensors may also be implemented such as a Reed switch and the like.

The inductor coil probes 508b, c which interface with the cavities 304b, c are coupled to a detection device such as an FCI as described in FIG. 1. The inductor coil probe 508 b, c includes an inductor coil 604 b, c and is also substantially self-contained. The inductor coil probes 508 b, c wirelessly communicate with the radio interface unit 400 b, c via cavities 304 b, c by magnetic field or electromagnetic field induction (also referred to as "magnetic field induction") in the manner described below.

Figure 5:
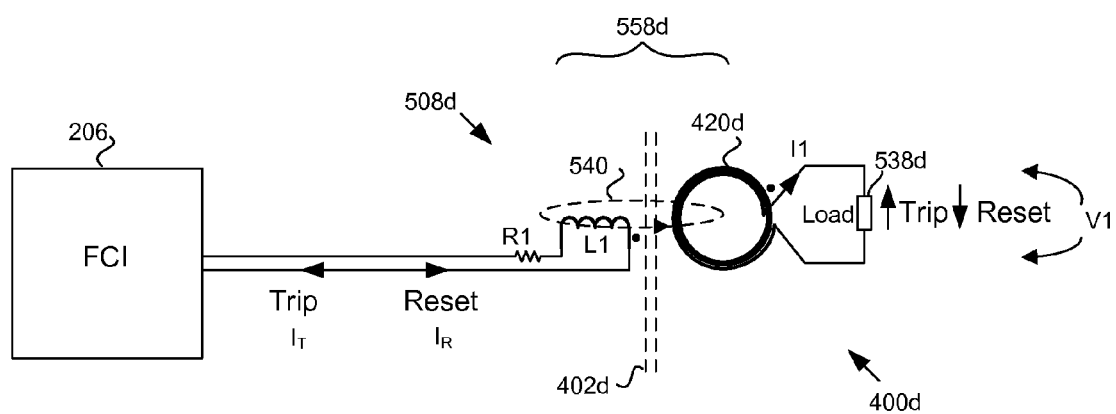
FIG. 5 is a circuit diagram of an embodiment of the present invention system illustrating the interaction between the communication member and the interface.

As illustrated in FIG. 5, during operation, a trip current signal $I_T$ is sent from a detection device, such as an FCI 206, when a conductor (e.g., 210 of FIG. 1) related thereto exceeds a select current threshold (e.g., upon an occurrence of a ground fault). The trip current signal $I_T$ induces a magnetic field 540 at the inductor coil L1 of the inductor coil probe 508d. The magnetic field 540 from the trip current $I_T$ induces a current $I_1$ in inductor coil 420d of the radio interface unit. This induced current further induces a voltage $V_1$ across load 538d. Information regarding the increased voltage $V_1$ across load 538d may be transmitted from the radio interface unit to a wireless handheld unit to signal a trip signal by an FCI.

Alternatively, a reset current signal $I_R$ may be sent from a detection device such as an FCI 206 after the current in a conductor (e.g., 210 of FIG. 1) is restored from a previously tripped condition. In order to distinguish between the reset current signal $I_R$ and the trip current signal $I_T$, these signals may be sent or established in opposite directions. The reset current signal $I_R$ induces a magnetic field 540 at the inductor coil L1 of the inductor coil probe 508*d*. The magnetic field 540 from the reset current $I_R$ induces a current $I_1$ in inductor coil 420*d* of the radio interface unit. This induced current further induces a voltage $V_1$ across load 538*d*. Information regarding the decreased voltage $V_1$ (as opposed to an increased voltage $V_1$ for a trip signal) across load 538*d* may be transmitted from the radio interface unit to the wireless handheld unit to signal a reset signal by an FCI.

Figure 6:
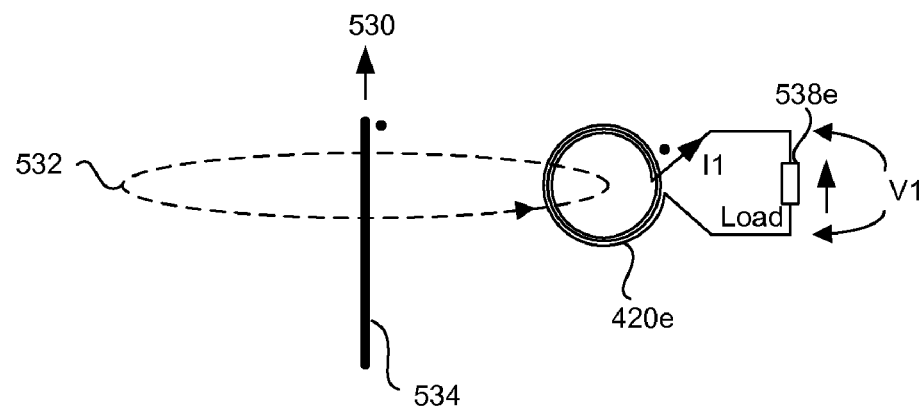
FIG. 6 is a circuit diagram showing magnetic field interference with the communication member and the interface.

Nevertheless, communication members having a single probe as discussed in the previous figures are often susceptible to magnetic or electromagnetic field interference from external sources. For example, as illustrated in FIG. 6, an interfering magnetic field 532 may be produced by an adjacent power line 534 carrying high current 530. The interfering magnetic field 532 may induce a current in inductor coil 420*e* of the radio interface unit. This induced current further induces a voltage $V_1$ across load 538*e*, and thereby produces a false trip or reset signal.

Figure 7:
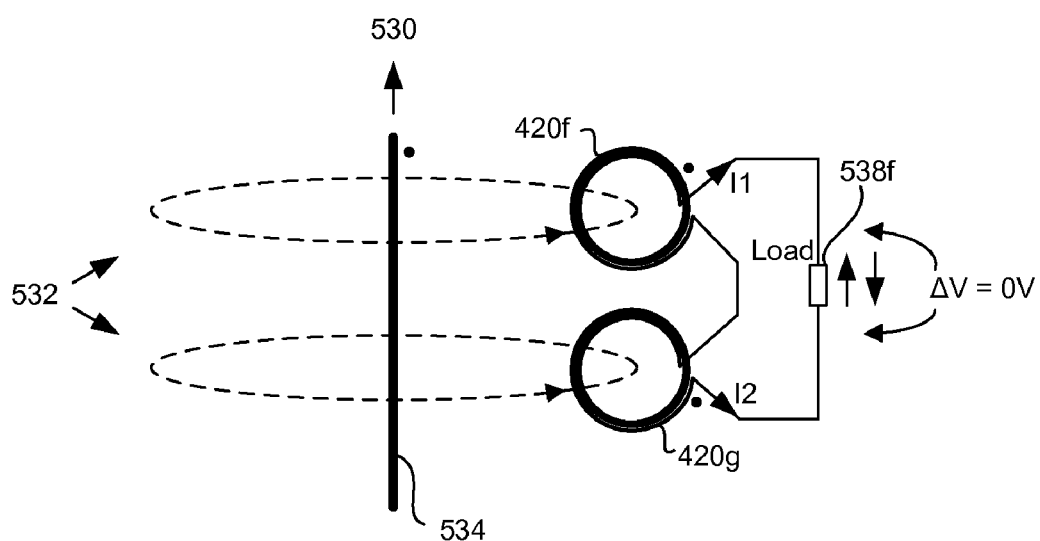
FIG. 7 is a circuit diagram of an embodiment of the present invention system showing the compensation for magnetic field interference implementing a differential inductor coil configuration.

As illustrated in FIG. 7, the interfering magnetic field 532 may be cancelled using a differential inductor coil configuration. In this arrangement, the communication member includes two inductor coils 420*f* and 420*g* which are connected in opposite directions. The interfering magnetic field 532 induces a current $I_1$ in inductor coil 420*f* and a current $I_2$ in inductor coil 420*g* of the radio interface unit. The currents $I_1$ and $I_2$ are induced in opposite directions and each induce a voltage $V_1$ in opposite polarity to each other across load 538*f*. Accordingly, this arrangement provides for a net induced voltage of 0, thereby compensating for interference from a magnetic field and thereby negating false signals.

Figure 8:
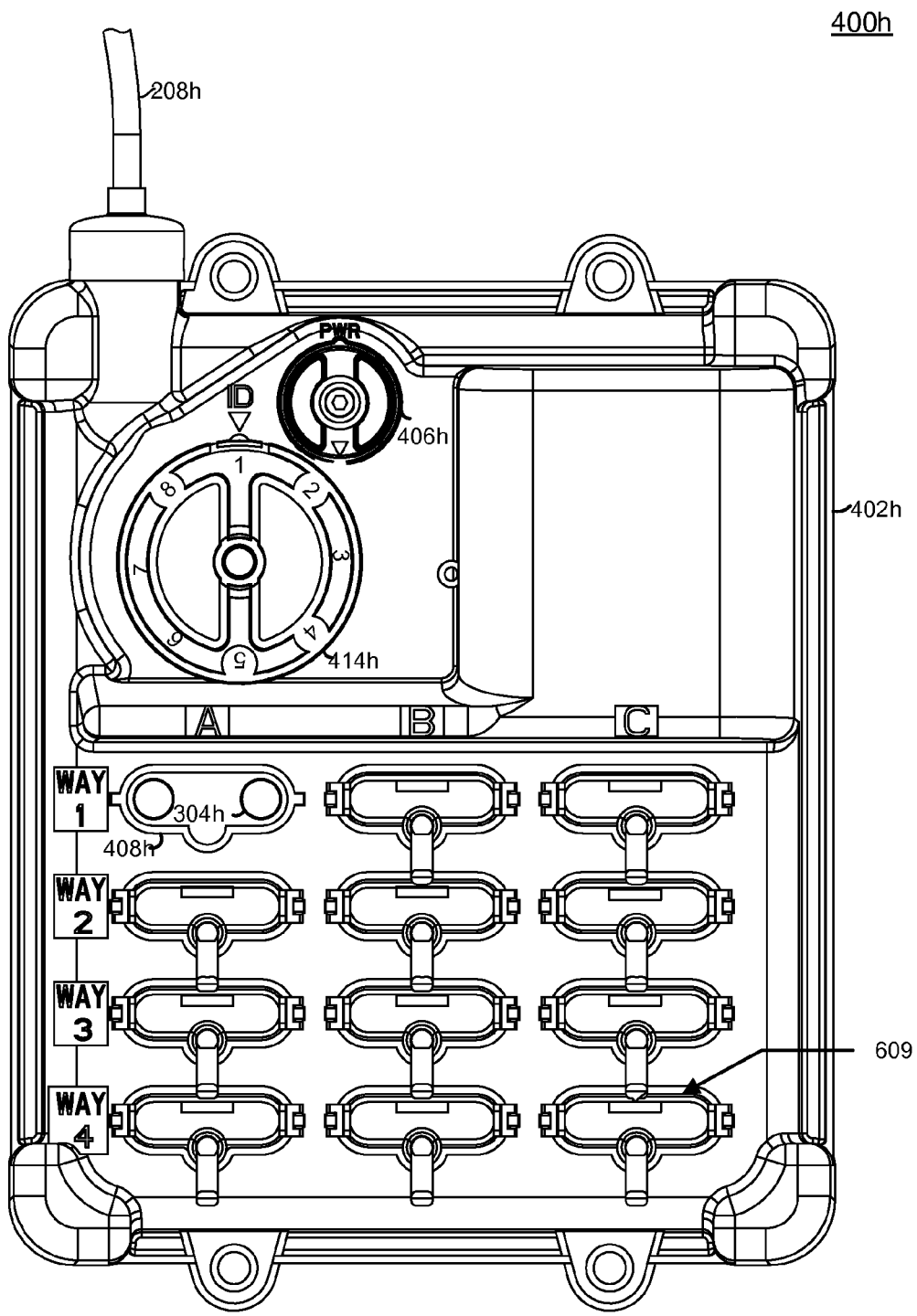
FIG. 8 illustrates an example of the housing of a radio interface unit in accordance with an aspect of the present invention.

Referring to FIG. 8, a radio interface unit 400*h* is provided for accommodating a differential inductor coil probe for cancelling interfering magnetic fields. The substantially self-contained construction of the housing 400*h* may be generally similar to the housing 402*h* described with respect to FIG. 3. Accordingly, the housing 402*h* further defines cavities (e.g., at 304*h*) for receiving differential inductor coil probes (e.g., at 609) having dual prongs in a manner in which they do not expose the electronic components contained within the housing 402*h* to the external environment.

In another embodiment, the radio interface unit 400*a* may be provided for accommodating a differential inductor coil for cancelling interfering magnetic fields. This embodiment is similar to that described above in conjunction with FIG. 8, except that each socket 408*a* includes only a single cavity 304*a* to accept the single inductor coil probe 508*a*. Instead of having a differential inductor coil probe for each probe 508*a*, there is a single differential inductor coil for cancelling interfering magnetic fields.

The differential inductor coil probes (e.g., at 609) which interface the cavities (e.g., at 304*h*) are coupled to a detection device such as an FCI as described with regards to FIG. 1. The differential inductor coil probe 609 is also substantially self-contained. The differential inductor coil probes (e.g., at 609) wirelessly communicate with the radio interface unit 400*h* via cavities (e.g., 304*h*) in the manner described below.

Figure 9A:
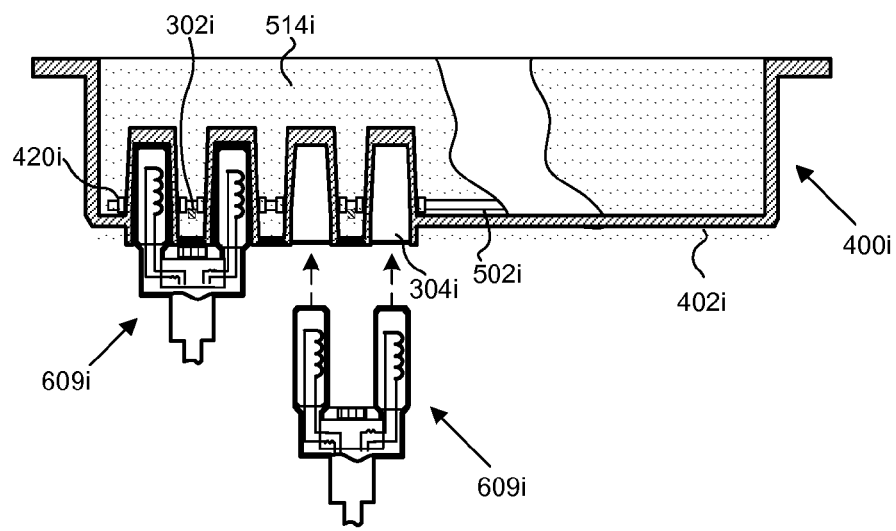
FIGS. 9A and 9B illustrate a cross-sectional view of an embodiment of the present invention system showing the engagement of the communication member and interface implementing a differential inductor coil configuration.
Figure 9B:
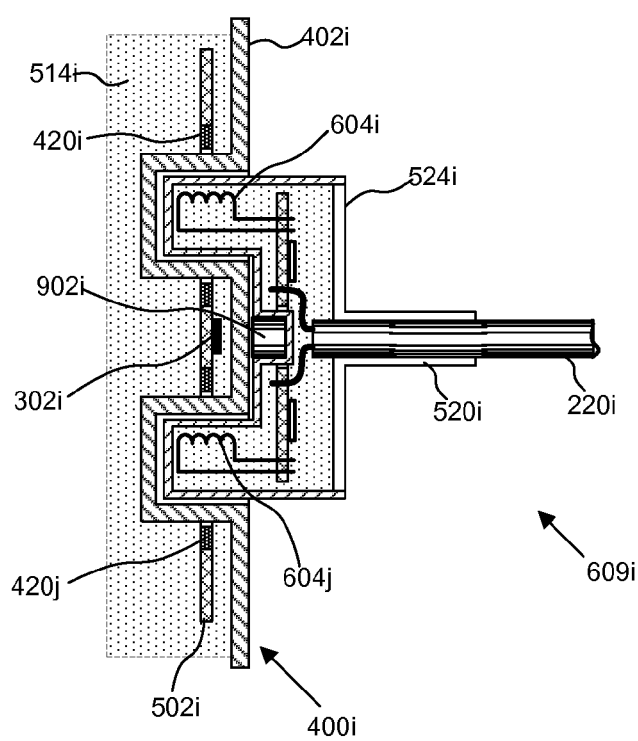
Figure 9C:
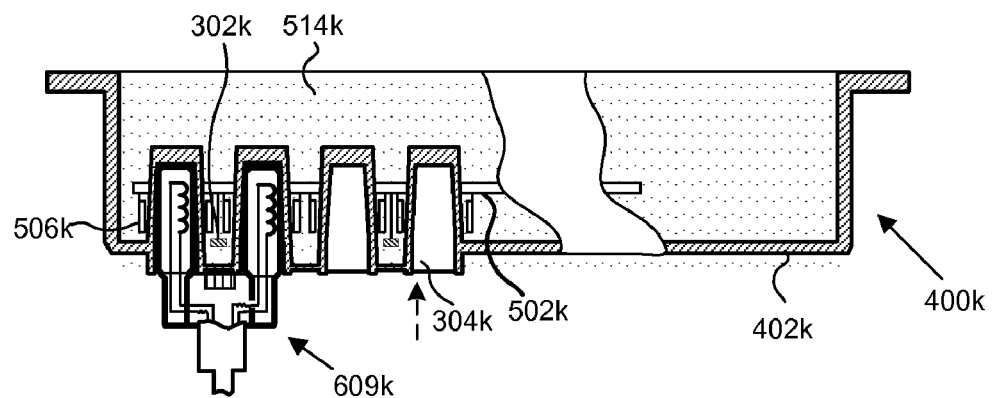
FIGS. 9C and 9D illustrate a cross-sectional view of another embodiment of the present invention system showing the engagement of the communication member and interface implementing a differential inductor coil configuration.
Figure 9D:
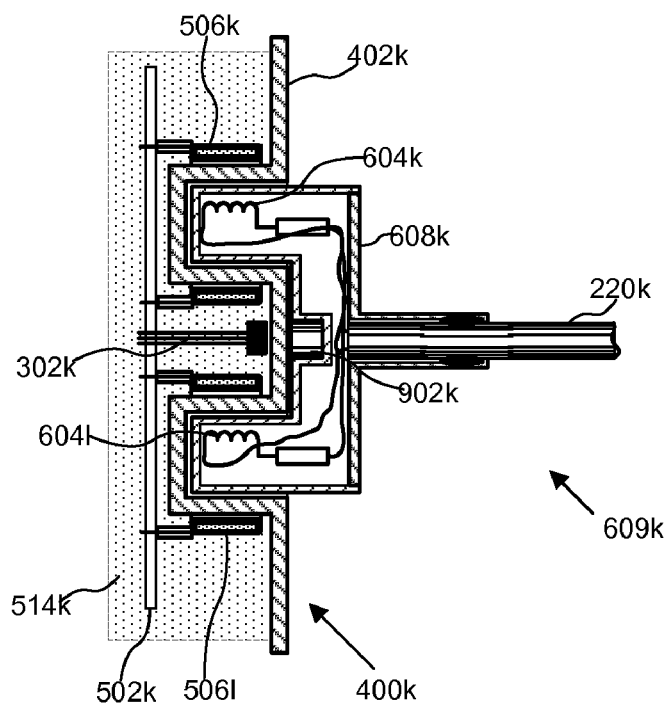

FIGS. 9A and 9B illustrate one embodiment of the hardware arrangement for the circuitry described with respect to FIG. 7 having an interface between the differential inductor coil probe and the cavity. Contained within the housing 402*i* are various electronic components of the radio interface unit 400*i*. The electronic components are further encapsulated by an encapsulate material 514*i* such as a potting material. The housing 402*i* further defines a plurality of cavities (e.g., at 304*i*) for receiving differential inductor coil probes (e.g., at 609*i*) in a manner in which they do not expose the electronic components contained within the housing 402*i* to the external environment. Further provided is a printed circuit board 502*i* which includes a plurality of magnetic field sensors such as hall-effect sensors (e.g., at 302*i*) and a plurality of inductors (e.g., at 420*i*) implemented thereon. FIGS. 9C and 9D are similar to FIGS. 5A and 9B with the exception that the inductors 506*k* of FIGS. 9C and 9D are in the form of coiled inductors.

During operation of each to the embodiments illustrated in FIGS. 9A-D, the interface between the differential inductor coil probes 609 *i, k* and the radio interface unit 400 *i, k* is as follows. The differential inductor coil probes 609 *i, k* may be inserted into the cavities 304*i, k*. For example, as shown in FIGS. 9B and 9D, a magnet 902 *i, k* is situated between the prongs of differential inductor coil probe 609 *i, k*. A corresponding magnetic field sensor (e.g., hall-effect sensor 302 *i, k*) situated on printed circuit board 502 *i, k* detects the presence of a magnetic field from magnet 902 *i, k* upon insertion of the differential inductor coil probe 609 *i, k* into the cavity 304 *i, k*. The hall-effect sensor 302 *i, k* produces a signal to the microprocessor, thereby signaling the presence of a differential inductor coil probe 609 *i, k*. Although a hall-effect sensor is described herein, other suitable elements may be implemented (e.g., a Reed switch).

The differential inductor coil probes 609 *i, k* which interface the cavities 304 *i, k* are coupled to a detection device such as an FCI as described with regards to FIG. 1. The differential inductor coil probe 609 *i, k* includes an inductor coil 604 *i, k* in each prong and is also substantially self-contained. The differential inductor coil probes 609 *i, k* wirelessly communicate with the radio interface unit 400*i, k* via cavities (e.g., 304 *i, k*) by magnetic field induction in the manner described below.

Figure 10:
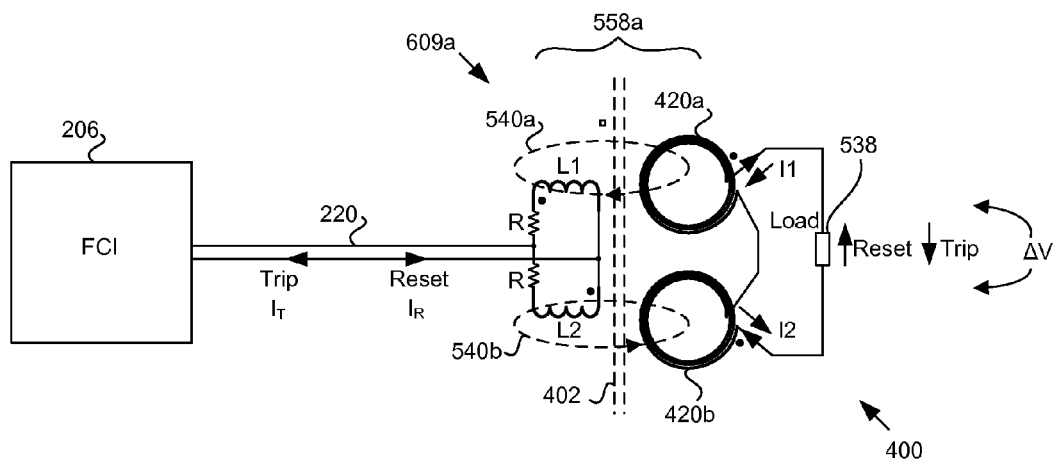
FIG. 10 is a circuit diagram of an embodiment of the present invention system illustrating the interaction between the communication member and the interface implementing a parallel inductor coil configuration.

FIG. 10 illustrates one embodiment which implements the differential coil configuration of FIG. 7. In this arrangement, the differential inductor coil probe 609*a* is in a parallel inductor coil configuration. During operation, two inductor coils 420*a* and 420*b* are connected in parallel in opposite directions. The interfering magnetic field (not shown) induces a current $I_1$ in inductor coil 420*a* and a current $I_2$ in inductor coil 420*b* of the radio interface unit. The currents $I_1$ and $I_2$ are induced in opposite directions and each induce a voltage $V_1$ in opposite polarity to each other across load 538, thereby canceling the respective voltages. Accordingly, this arrangement provides for a net induced voltage of 0, thereby compensating for interference from a magnetic field and negating false signals.

The arrangement of FIG. 10, in effect, forms a differential pulse transformer configuration 558*a*, whereupon high-energy, short-lasting pulses are transmitted with low distortions. During operation, a trip current signal $I_T$ is sent from a detection device such as an FCI 206 when a conductor (e.g., 210 of FIG. 1) related thereto exceeds a select current threshold (e.g., upon an occurrence of a ground fault) via cable 220 into differential inductor coil probe 609*a* with series load resistors R. The inductor coils L1 and L2 are connected in parallel to generate magnetic fields 540*a* and 540*b* in opposite directions. The trip current signal $I_T$ induces magnetic fields 540*a* and 540*b* in opposite directions. The magnetic fields 540*a* and 540*b* from the trip current $I_T$ induces currents $I_1$ and $I_2$ in inductor coils 420*a* and 420*b* of the radio interface unit. The induced currents $I_1$ and $I_2$ further induce a differential voltage $\Delta_V$ across load 538. Information regarding a positive differential voltage $\Delta_V$ across load 538 may be transmitted from the radio interface unit to the wireless handheld unit to signal a trip signal by an FCI.

Alternatively, a reset current signal $I_R$ may be sent from a detection device such as an FCI 206 after the current in a conductor (e.g., 210 of FIG. 1) is restored from a previously tripped condition. In order to distinguish between the reset current signal $I_R$ and the trip current signal $I_T$, these signals may be sent or established in opposite directions. The reset current signal $I_R$ induces magnetic fields 540a and 540b in opposite directions. The magnetic fields 540a and 540b from the reset current $I_R$ induces currents $I_1$ and $I_2$ in inductor coils 420a and 420b of the radio interface unit. The induced currents $I_1$ and $I_2$ further induce a differential voltage $\Delta_V$ across load 538. Information regarding a negative differential voltage $\Delta_V$ across load 538 may be transmitted from the radio interface unit to the wireless handheld unit to signal a reset signal by an FCI.

Figure 11:
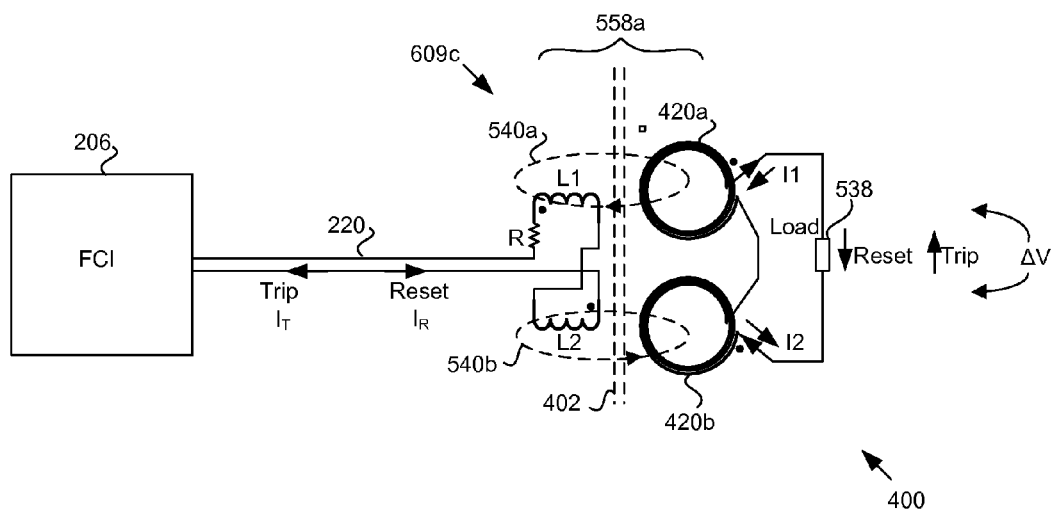
FIG. 11 is a circuit diagram of an embodiment of the present invention system illustrating the interaction between the communication member and the interface implementing a serial inductor coil configuration.

In yet another embodiment, FIG. 11 illustrates another embodiment which implements the differential coil configuration of FIG. 7. In this arrangement, the differential inductor coil probe 609c is in a serial inductor coil configuration. During operation, two inductor coils 420a and 420b are connected in series in opposite directions. The interfering magnetic field (not shown) induces a current $I_1$ in inductor coil 420a and a current $I_2$ in inductor coil 420b of the radio interface unit. The currents $I_1$ and $I_2$ are induced in opposite directions and each induce a voltage $V_1$ in opposite polarity to each other across load 538, thereby canceling the respective voltages. Accordingly, this arrangement provides for a net induced voltage of 0, thereby compensating for interference from a magnetic field and negating false signals.

The arrangement of FIG. 11, in effect, forms a differential pulse transformer configuration 558a, whereupon high-energy, short-lasting pulses are transmitted with low distortions. Because the inductor coils L1 and L2 are connected in series, the design values thereof are generally lower than the parallel arrangement of FIG. 10 due to the additive or period inductance. During operation, a trip current signal $I_T$ is sent from a detection device such as an FCI 206 when a conductor (e.g., 210 of FIG. 1) related thereto exceeds a select current threshold (e.g., upon an occurrence of a ground fault) via cable 220 into differential inductor coil probe 609a with series damping ringing pulse resistors R. The inductor coils L1 and L2 are connected in series to generate magnetic fields 540a and 540b in opposite directions. The trip current signal $I_T$ induces magnetic fields 540a and 540b in opposite directions. The magnetic fields 540a and 540b from the trip current $I_T$ induces currents $I_1$ and $I_2$ in inductor coils 420a and 420b of the radio interface unit. The induced currents $I_1$ and $I_2$ further induce a differential voltage $\Delta_V$ across load 538. Information regarding a positive differential voltage $\Delta_V$ across load 538 may be transmitted from the radio interface unit to the wireless handheld unit to signal a trip signal by an FCI.

Alternatively, a reset current signal $I_R$ may be sent from a detection device such as an FCI 206 after the current in a conductor (e.g., 210 of FIG. 1) is restored from a previously tripped condition. In order to distinguish between the reset current signal $I_R$ and the trip current signal $I_T$, these signals may be sent or established in opposite directions. The reset current signal $I_R$ induces magnetic fields 540a and 540b in opposite directions. The magnetic fields 540a and 540b from the reset current $I_R$ induces currents $I_1$ and $I_2$ in inductor coils 420a and 420b of the radio interface unit. The induced currents $I_1$ and $I_2$ further induce a differential voltage $\Delta_V$ across load 538. Information regarding a negative differential voltage $\Delta_V$ across load 538 may be transmitted from the radio interface unit to the wireless handheld unit to signal a reset signal by an FCI.

Figure 12:
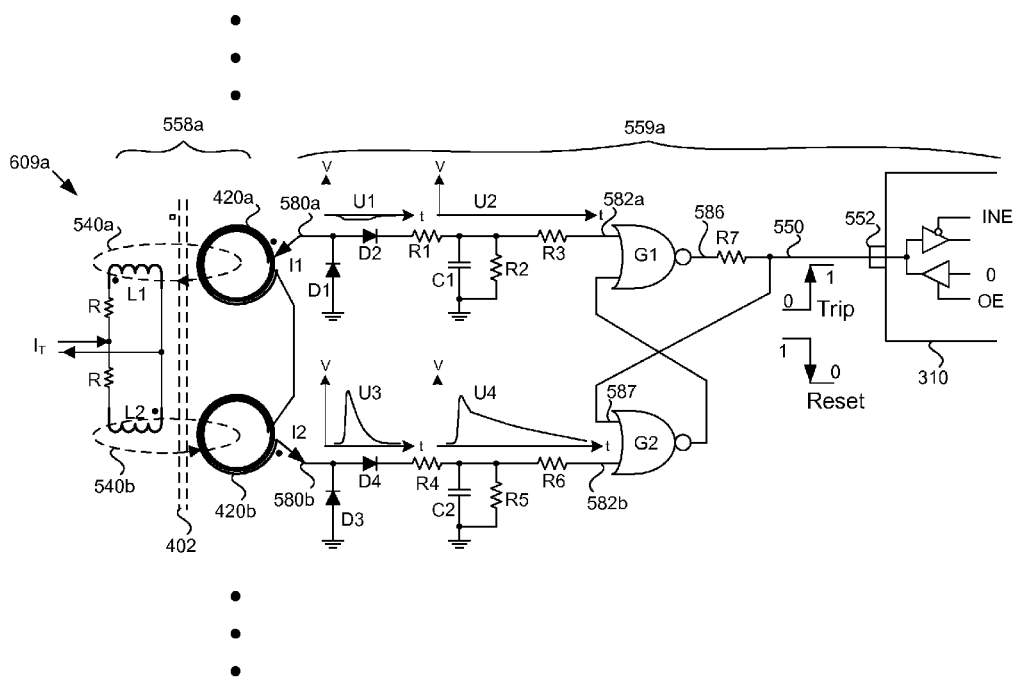
FIG. 12 is a circuit diagram of an embodiment of the present invention system illustrating the interaction between the communication member and the interface implementing a circuit for preventing false latching from ringing currents.

FIG. 12 illustrates another embodiment which implements the differential coil configuration of FIG. 7. In this arrangement, a trip current $I_T$ or a reset current $I_R$ signal from the differential inductor coil probe 609a generates equal and opposite magnetic fields 540a and 540b. The magnetic fields 540a and 540b induce currents $I_1$ and $I_2$ in the radio interface unit. A detection circuit 559a is further provided with symmetrical network branches having inputs 580a and 580b coupled to inductor coils 420a and 420b. Symmetrical ends 582a and 582b are further coupled to a latching flip-flop G1/G2 and a microcontroller 310. Each symmetric network branch includes a series diode; an amplitude control element such as a shunt diode or a shunt resistor; a low pass filter; and a charging circuit (or charge holding circuit). In an embodiment of the detection circuit 559a, shunt diodes D1 and D3 are the amplitude control elements for the incoming pulse, whereas the low pass filter and charging circuit is formed by a network of resistors and capacitor.

More specifically, the direction of the voltage/current peak from an induced pulse is detected with four diodes (D1, D2, D3 and D4) at inputs 580a and 580b, respectively. A positive pulse U3 FIG. 13A ii (at D3 and D4) is directed through resistor R4 into capacitor C2, storing the charge. Resistor R5 or R2 allows capacitor discharging of positive pulse U3 in a controlled manner, preventing false latching from ringing currents from the FCI and probe circuits (e.g., L1, L2 and R). A negative pulse U1 FIG. 13Ai is conducted through diode D1, with diode D2 blocking any residual voltage from getting into capacitor C1 through clamping in diode D1 and reverse bias rectification in diode D2. Diode D1 clamps the negative pulse at about −0.5 V to −0.8 V, depending on the diode type.

The R4/C2 (and R1/C1) components create a low-pass filter, preventing high frequency spikes changing the logic state of the flip-flop gates G1/G2 (NOR gate flip flops). The positive pulse U3 generates a current, through R4, which charges capacitor C2. Resistors R6 and R3 each prevent latch-up of respective CMOS gates G2 and G1, and allow charging capacitors C1 and C3 to reach a higher voltage above the internal CMOS gates clamping voltage. Charging and retaining charge is important in preventing undesired flip-flop action due to ringing in the Trip/Reset pulses. In this arrangement, NOR gates G1 and G2 are further connected in an R-S flip-flop configuration, with active-high inputs.

Pulse U4 FIG. 13B ii is applied to gate G2 input 587 of the flop-flop. If the flip-flop outputs logic 0 on G1 at output 587, prior to the trip pulse, the pulse changes the logic state of line 550 from logic 0 to logic 1. The status of the flip-flop is evaluated with a microprocessor 310 at I/O interface 552. The microprocessor 310 such as a Texas Instruments MSP430 family is suitable for this application where a standard program can be written.

On a power-up, flip-flop G1/G2 sets a random output logic level on line 550. Resistor R7, serial with the G1 output, allows for resetting of the flip-flop G1/G2 with the microprocessor 310. A program may further be provided for driving the microprocessor 310, changing the I/O interface 552 from input to output, and setting line input 550 with a logic 0. If, at the same time, the gate G1 outputs logic 1, the resistor R7 allows voltage at gate G2 input 587 to drop below the threshold level of logic 0, causing flip-flop G1/G2 to change the G1 output to logic 0. This circuit arrangement allows reusing the same line 550 to read logic data from flip-flop G1/G2 and resetting the flip-flop G1/G2, with a single copper trace line input 550 and a single reset resistor R7.

The flip-flop NOR gates G1/G2 may further create a CMOS memory location, thereby allowing for latching and storage of logic values for month and years. CMOS inherently uses a relatively small supply current, thereby allowing for extension of the lifetime of a supply battery.

A ringing pulse from a trip pulse or a reset pulse can often cause false latching. The arrangement of FIG. 12 provides for an embodiment which suppresses such false latching. FIGS. 13A-13C depict the progression of a ringing pulse exiting the detection circuit of FIG. 12 and the suppression of false latching caused by ringing.

The arrangement of FIG. 12 is designed to accept a trip/reset pulse from a various FCI sensors and differential inductor coil probes. Such hardware diversification may result in a trip or reset pulse with multiple ringing portions such as 560b, 564a and 566b in induced pulse U1, and 560c, 564c and 566c in induced pulse U3 shown in FIGS. 13Ai and 13Aii. In effect, induced pulses U1 and U3 generated by differential pulse transformer 558a at both ends of the coil pair (e.g., inductor coils 420a and 420b) will be of similar amplitude and reversed polarity in the absence of shunt diodes D1 and D3 and series diodes D2 and D4 (shown as dotted lines).

Shunt diodes D1 and D3 may be used to clamp a negative pulse, whereas series diodes D2 and D4 may be used to rectify and pass a positive pulse in forward bias. Diode pairs D1 and D2 clamp and rectify negative and positive pulse portions 560a, 564a and 566a in a reversed polarity induced pulse U1. Diode pairs D3 and D4 rectify and clamp positive and negative pulse portions 560c, 564b and 566c, respectively, in a positive polarity induced pulse U3.

FIG. 13Bi depicts the voltage of pulse U2 across capacitor C1, induced by a ringing pulse U1. An erred latching of the flip-flop G1/G2 may result if the voltage of pulse U2 reaches above the logic 1 threshold 570. The desired positive polarity induced pulse U3 depicted in FIG. 13A ii with a higher amplitude generates filtered pulse U4 across capacitor C2 as shown in FIG. 13Bii, that in turn generates logic 1 for gate G2. The charge of pulse U4 across capacitor C2 holds longer than the later charging of ringing pulse U2 across C1 as shown in FIG. 13Bi.

FIG. 13c superimposes pulses U2 and U4 presented to the flip-flop G1/G2 to illustrate the concept that an extended logic 1 level of pulse U4 presented to gate G2 outlasts a false logic 1 caused by ringing pulse U2 presented to gate G1, thus preserving a proper logic latch by the flip-flop G1/G2. The time constant of the C2/R5/R6 (or C1/R2/R3) allows for rejection of most false ringing voltage of pulse U2 by a voltage margin 572, and a time margin 574 depending on the amplitude differences of pulses U4 and U2 set at the logic level in G1/G2. The diode pair and RC network in differential arrangement allows for error-free detection of the desired induced pulse U4 under the presence of a "ringing" signal U2 on the opposite side of the differential pulse transformer 558. The same principle of operation applies if the induced pulses U1 and U3 are of reverse polarity, except that the pulses in FIGS. 13a to 13c will be interposed between U1 and U3, and between U2 and U4. The teachings described in relation to FIGS. 12 and 13 may further be implemented for a single probe differential coil configuration without deviating from the spirit of the present invention.

Further according to the present invention, it is envisioned that any type of detection device that is capable of sending a positive and a negative signal may be used in conjunction with the radio interface unit. Some examples of detection devices (other than an FCI) that may be used include, for example: water, high voltage electric field, specific gravity, light, and sound, gas sensors such as CO, CO2, SOx, NOx, Ammonia, Arsine, Bromine, Chlorine, Chlorine Dioxide, VOCs, Combustibles, Diborane, Ethylene Oxide, Fluorine, Formaldehyde, Germane, Hydrogen, Hydrogen Chloride, Hydrogen Cyanide, Hydrogen Fluoride, Hydrogen Selenide, Hydrogen Sulfide, Oxygen, Ozone, Methane, Phosgene, Phosphine, Silane, and the like; pressure sensors for sensing, for example, pressure in a gas line, water line, waste line, oil line, and the like; temperature sensors; electromagnetic radiation sensors; radiation sensors; smoke sensors; particulate matter sensors; liquid phase sensors such as pH, turbidity, Br−, Ca2+, Cl−, GN−, Cu2+, F−, I−, K+, Na+, NH4+, NO3−, Pb2+, S−(AG+), conductivity sensors, and the like; radio wave sensors; electrical sensors such as under voltage sensors, over voltage sensors, under current sensors, over current sensors, frequency sensors and the like; power factor alarms; demand overload indicators; sensors that detect the presence of primary system voltage; sensors that determine if a sealed subsurface fuse has operated by sensing voltage on each side of fuse element with loss of load current; sensors that sense the open or closed position of a subsurface switch; voltage sensors which monitors status of lead-acid batteries used to run controller or motor operators for subsurface switches; power quality sensors which detect primary voltage swells and sags along the distribution system, and other sensors that detect power quality issues and send an alarm status.

The detection device communicates with the radio interface unit 400 according to any of the embodiments herein described. Thus, the faulted circuit indicator monitoring system of the present invention may be used to monitor states that are detected with any of the detection devices mentioned above.

It is a further aspect of this invention that the faulted circuit indicator monitoring system differentiate between the different types of detection devices that may be in communication with the radio interface unit 400. The differentiation may be performed between two different types of detection devices using the permanent magnet (e.g., at 902b, 902c, 9021, or 902k) of the inductor coil probes (e.g., at 508a, 508b, 508c, 609, 609i, or 609k) and the magnetic field sensor (e.g., 302b, 302c, 302i, or 302k). The polarity of the permanent magnet (e.g., at 902b, 902c, 902i, or 902k) for a particular type of detection device may be a polar opposite from the permanent magnet (e.g., at 902b, 902c, 9021, or 902k) for another particular type of detection device. The radio interface unit 400 may then be configured to transmit the status of only one particular type of detection device when interrogated by a specific wireless device 102 (or when the wireless device 102 interrogates using a specific algorithm), and transmit the status of another particular type of detection device when interrogated by another specific wireless device 102 (or when the wireless device 102 interrogates using another algorithm).

For example, the radio interface unit 400 may be mounted in a vault 200 containing electrical conductors for an electrical power utility, and access to water lines for a water utility. Faulted circuit indicators may be used to monitor faulted circuits on the electrical conductors, and may be in communication with the radio interface unit 400 using the various probe systems described herein. However, the inductor coil probes (e.g., at 508a, 508b, 508c, 609, 609i, or 609k) for the faulted circuit indicators would be configured such that the permanent magnets (e.g., at 902b, 902c, 9021, or 902k) have a common pole (north) facing the magnetic field sensor (e.g., 302b, 302c, 302i, or 302k). If the radio interface unit 400 has twelve connector sockets (e.g., 408a, 408h), less then all of them may be used used by the faulted circuit indicators. The magnetic field sensors (e.g., 302b, 302c, 302i, or 302k) would sense that all of these inductor coil probes (e.g., at 508a, 508b, 508c, 609, 609i, or 609k) have permanent magnets (e.g., at 902b, 902c, 9021, or 902k) with a common polarity.

The radio interface unit 400 may also be in communication with inductor coil probes (e.g., at 508a, 508b, 508c, 609, 609i, or 609k) from detection devices for the water utility. For example, the water utility may want to monitor whether the pressure in the water lines exceeds a threshold. The water utility could install such detection devices on the water lines, and have these water pressure detection devices communicate with inductor coil probes (e.g., at 508a, 508b, 508c, 609, 609i, or 609k) in communication with the remaining connector sockets (e.g., 408a, 408h) of the radio interface unit 400. The inductor coil probes (e.g., at 508a, 508b, 508c, 609, 609i, or 609k) from the water utility would include permanent magnets (e.g., at 902b, 902c, 9021, or 902k) having a common pole (south) facing the magnetic field sensor (e.g., 302b, 302c, 302i, or 302k). The pole of the permanent magnets (e.g., at 902b, 902c, 9021, or 902k) facing the inductor coil probes (e.g., at 508a, 508b, 508c, 609, 609i, or 609k) of the water utility would be opposite the pole of the permanent magnets (e.g., at 902b, 902c, 9021, or 902k) facing the inductor coil probes (e.g., at 508a, 508b, 508c, 609, 609i, or 609k) of the electric utility. In this way, the radio interface unit 400 could differentiate between detection devices of different utilities, and transmit information relating only to the utility that interrogates the radio interface unit 400.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

We claim:

1. A system for communicating information from a detection device, comprising:
   a communication member coupled to the detection device, said communication member including an inductor, and
   an interface in communicating relation with said communication member, said interface including another inductor, whereupon a signal from the detection device effectuates a magnetic field produced by the inductor of the communication member, said magnetic field being transmitted to the inductor of the interface;
   wherein the interface includes a differential inductor coil configuration.

2. The system of claim 1, wherein the detection device is one selected from the group consisting of: water, high voltage electric field, specific gravity, light, sound, a faulted circuit indicator, a gas sensors, a CO sensor, a CO2 sensor, a sulphur oxides sensor, nitrogen oxides sensor, an ammonia sensor, an arsine sensor, a bromine sensor, a chlorine sensor, a chlorine sensor, a dioxide sensor, a volatile organic compound sensor, a diborane sensor, an ethylene oxide sensor, a fluorine sensor, a formaldehyde sensor, a germane sensor, a hydrogen sensor, a hydrogen chloride sensor, a hydrogen cyanide sensor, a hydrogen fluoride sensor, a hydrogen selenide sensor, a hydrogen sulfide sensor, an oxygen sensor, an ozone sensor, a methane sensor, a phosgene sensor, a phosphine sensor, a silane sensor, a pressure sensor, a temperature sensor, an electromagnetic radiation sensor, a radiation sensor, a smoke sensor, a particulate matter sensor, a liquid phase sensor, a pH sensor, a turbidity sensor, a Br− sensor, a Ca2+ ensor, a CI− sensor, a CN− sensor, a Cu2+ sensor, a F− sensor, a I− sensor, a K+ sensor, a Na+ sensor, an NH4+ sensor, a NO3− sensor, a Pb2+ sensor, a S-(AG+) sensor, a conductivity sensor, a radio wave sensor, an electrical sensor, an under voltage sensor, an over voltage sensor, an under current sensor, an over current sensor, a frequency sensor, a power factor alarm, a demand overload indicator, a voltage detector, a sensor that determine if a sealed subsurface fuse has operated by sensing voltage on each side of fuse element with loss of load current, a sensor that senses the open or closed position of a subsurface switch, a voltage sensor that monitors status of a lead-acid battery, a power quality sensor, and combinations thereof.

3. The system of claim 1, wherein the detection device is a faulted circuit indicator.

4. The system of claim 1, wherein the communication member is substantially self-contained.

5. The system of claim 1, wherein the interface is substantially self-contained.

6. The system of claim 1, wherein the interface comprises a radio frequency transmitter.

7. The system of claim 1, wherein the communication member further comprises a magnet and the interface further comprises a magnetic field sensor for detecting whether the communication member is in communicating relation with the interface.

8. The system of claim 1, wherein the communication member further comprises a magnet and the interface further comprises a magnetic field sensor for detecting the pole of the magnet.

9. The system of claim 8, comprising a first detection device coupled to a first communication member comprising a magnet with a first pole positioned toward a first magnetic field sensor, and a second detection device coupled to a second communication member comprising a magnet with a second pole positioned toward a second magnetic field sensor.

10. The system of claim 1, wherein the interface further includes a securing member for securing the communication member thereto.

11. The system of claim 1, wherein the inductor of the interface is a coiled inductor.

12. The system of claim 1, wherein the inductor of the interface is implemented on a printed circuit board.

13. The system of claim 1, wherein a change in the magnetic field signals a fault detected by the detection device.

14. The system of claim 1, wherein a change in the magnetic field signals a reset of the detection device.

15. The system of claim 1, wherein differential inductor coil configuration reduces magnetic field interface.

16. The system of claim 15, wherein the interface includes two inductor coils connected in opposite directions.

17. The system of claim 1, wherein the communication member includes a differential inductor coil configuration for reducing magnetic field interference.

18. The system of claim 1, wherein the communication member includes two probes each having one of the inductor coils contained therein.

19. The system of claim 17, wherein the communication member includes two inductor coils connected in opposite directions.

20. The system of claim 17, wherein the communication member includes two inductors in serial inductor coil configuration.

21. The system of claim 17, wherein the communication member includes two inductors in parallel inductor coil configuration.

22. The system of claim 15, wherein the interface prevents false latching from ringing currents.

23. A system for detecting whether a connection member of a detection device is in communicating relation with a device interface, comprising:

a connection member including a magnet, said connection member being coupled to a detection device, and a device interface including a magnetic field sensor, wherein upon detection of a magnetic field produced by the magnet of the connection member, the magnetic field sensor produced by the magnet of the connection member, the magnetic field sensor produces a responsive signal indicative of the connection member being in communicating relation with the device interface;

wherein the device interface includes a differential inductor coil configuration.

24. The system of claim 23, wherein the magnetic field sensor is a hall-effect sensor.

25. The system of claim 23, wherein the magnetic field sensor is a Reed switch.

26. The system of claim 23, wherein the detection device is a faulted circuit indicator.

27. The system of claim 23, wherein the device interface is a radio frequency transmitter.

28. The system of claim 23, wherein the device interface further includes a securing member for securing the connection member thereto.

29. The system of claim 23, wherein the connection member includes two probes and the magnet is positioned between the two probes.

* * * * *